United States Patent [19]
Ackerman

[11] Patent Number: 4,508,970
[45] Date of Patent: Apr. 2, 1985

[54] MELT LEVEL SENSING SYSTEM AND METHOD
[75] Inventor: Charles B. Ackerman, Paradise Valley, Ariz.
[73] Assignee: Motorola, Inc., Schaumburg, Ill.
[21] Appl. No.: 398,495
[22] Filed: Jul. 15, 1982
[51] Int. Cl.³ ............................................. G01N 21/26
[52] U.S. Cl. .................................... 250/577; 422/106; 422/249; 156/601; 73/293
[58] Field of Search ............... 422/249, 106; 156/601, 156/617 SP; 250/577, 560; 73/293; 356/1, 4

[56] References Cited
U.S. PATENT DOCUMENTS

| | | | |
|---|---|---|---|
| 3,574,650 | 4/1971 | House | 250/577 |
| 3,740,563 | 6/1973 | Reichard | 250/577 |
| 3,882,319 | 5/1975 | Clement et al. | 250/577 |
| 4,036,595 | 7/1977 | Lorenzini et al. | 422/249 |
| 4,282,184 | 8/1981 | Fiegl et al. | 422/106 |

Primary Examiner—David C. Nelms
Assistant Examiner—Ernest Austin, II
Attorney, Agent, or Firm—William J. Kubida

[57] ABSTRACT

A sensing system and method for detecting changes in the level of a liquid surface utilizing a source of essentially monochromatic illumination of narrow beam width for directing an incident beam toward a liquid surface at an oblique angle thereto, and thereby providing a reflected beam therefrom. A beam expander is interposed between the illumination source and the liquid source for increasing the narrow beam width of the incident beam to a beam width substantially greater than the wavelength of disturbances in the liquid surface. A converging lens is mounted transverse to and intercepts a portion of the reflected beam from the liquid surface for focusing that portion of the reflected beam to a centrum. A beam detector is positioned adjacent to the centrum for providing an indication of changes in the level of the liquid surface by detecting corresponding changes in a relative position of the centrum. An optical filter can be used to intercept the reflected beam to allow only the frequency of the monochromatic illumination source to pass therethrough in a Czochralski furnace.

17 Claims, 3 Drawing Figures

MELT LEVEL SENSING SYSTEM AND METHOD

BACKGROUND OF THE INVENTION

The present invention relates to liquid level sensing systems and methods. Particularly, the present invention relates to a system and method of exceptional utility in the sensing of melt level in a silicon crystal growing furnace of the Czochralski type.

The successful growth of silicon crystals using the Czochralski process requires the establishment and control of the correct position for the melt level with respect to the hot zone. Previously, control of this parameter has been established by "dead reckoning" based on measurements of the necessary parameters to relate the mass of the charge loaded into the crucible and the external crucible shaft position, to a known initial melt level. In order to maintain this initial melt level, the cup lift rate for the crucible is calculated as a ratio, (or percent of pull rate) using the crystal diameter, crucible diameter, and density change from solid to liquid. The sensing of the initial melt level is critical in establishing the reproducibility of the crystal growing process in a production mode.

However, the initial position calculation using the "dead reckoning" method can introduce significant errors into the growing process due to the plastic flow of the quartz crucible to conform to the graphite cup at the high temperatures encountered. Further, there always exists the possibility of the operator's mental errors in calculation.

The control of melt level during the growing process suffers from all of the aforementioned uncertainties as well as requiring updated corrections for variations in crystal diameter. Additionally, the fact that a small error in the calculated ratio produces a cumulative error in the long growth cycles typical of today's large furnaces, further renders the "dead reckoning" method unacceptable. Typically, failure to accurately control the melt level will result in crystal yield losses due to either loss of crystal structure or poor diameter control since, in the latter instance, the diameter sensor is dependent on maintaining a fixed melt level, (or at least a known melt level) which level can be used to correct the diameter sensing system. As a practical matter, a crystal diameter less than that desired results in wholly wasted crystal material, while a crystal diameter exceeding that desired will require grinding to bring it down to the correct size. In this latter instance, there is still a wastage of material as well as the time and effort involved in grinding.

Overall, the need for improved melt level control has become more and more important and with larger, long cycle furnaces, it has become an absolute necessity for automating the crystal growing process. In this regard, U.S. Pat. No. 3,740,563 which issued to Reichard, describes an electro-optical system and method for sensing and controlling the diameter and melt level of pulled crystals. This patent describes a system which reflects a narrow beam of light off the meniscus occurring at the periphery of the growing crystal with the liquid melt surface. The reflected beam therefrom is detected with a two-axis spot locator. According to the system described, movement of the reflected beam in a tangential direction is primarily due to changes in melt level, while movement in a radial direction is primarily due to changes in diameter. While using the small meniscus area provides a relatively vibration free reflective surface, the system described cannot however, be used to establish initial melt level due to vibrations or waves on the free melt surface. Further it would, in fact, have problems when used in conjunction with out of round or faceted crystals or crystals which may orbit in a slightly eccentric manner as is common in the Czochralski process employing cable or chain lift pulling mechanisms. Further, the use of the chopped light source and synchronized detector circuit described does not result in as good a signal to noise ratio as is achieved by using the extremely high intensity, narrow pass optical system of this invention.

U.S. Pat. No. 3,574,650 issued to House, describes a vacuum deposition system for the control of the location of the evaporation source. This patent describes the use of a laser to reflect a beam of light off of a small metallic melt used as a vapor source in a vacuum deposition process. While the use of a small diameter monochromatic light source such as a laser coupled with a filter would improve the signal to noise ratio of the system, the system is restricted to small surface tension stabilized melts due to the small beam diameter and its vulnerability to being seriously disturbed by melt vibrations. The system described is therefore concerned with measuring an angle of incidence and reflection on a small stabilized melt surface and is not an averaging system which can deal with the ripply surface of a large unstable melt surface.

Thus, it is apparent that there remain several problems in the accurate sensing of melt level which have not been addressed by the aforementioned patents or other systems hereinbefore introduced. Firstly, the light beam reflecting off of the melt surface is accompanied by the intense thermal radiation emitted and reflected from the melt surface thus creating a significant signal to noise ratio problem in detecting a reflected beam from the melt surface. Secondly, the surface of the melt does not resemble a flat mirror, but rather is disturbed by ripples and waves due to turbulent convection and other mechanical disturbances resulting from cup rotation and erratic wetting of the crystal at the crucible. Normally, a beam deviation of up to several inches at the view port can be expected for a small beam under these conditions. Finally, any optical measurement of the melt level must contend with changes in the transmission of the furnace view ports due to the condensation of oxides and dopants thereon as well as possible light source variations.

It is therefore an object of the present invention to provide an improved melt level sensing system and method.

It is further an object of the invention to provide an improved melt level sensing system and method which will accurately determine the initial melt level in a Czochralski crystal growing process.

It is still further an object of the invention to provide an improved melt level sensing system and method which provides a good signal to noise ratio in the presence of intense thermal radiation.

It is still further an object of the invention to provide an improved melt level sensing system and method which will accurately determine melt level in the presence of surface waves and ripples due to turbulent convection and mechanical vibrations due to cup rotation or other causes.

It is still further an object of the invention to provide an improved melt level sensing system and method which allows for the accurate sensing of melt level despite the partial obscuration of the furnace view ports due to the condensation of oxides and dopants or the presence of light source variations.

SUMMARY OF THE INVENTION

The foregoing objects are achieved in the present invention wherein a sensing system and method for detecting changes in the level of a liquid surface include a source of essentially monochromatic illumination of narrow beam width for directing an incident beam toward a liquid surface at an oblique angle thereto, thereby also providing a reflected beam therefrom. A beam expander is interposed between the illumination source and the liquid surface for increasing the beam width of the incident beam to one substantially greater than the wavelength of any disturbances encountered on the liquid surface. A converging lens is mounted transverse to, and intercepts a portion of, the reflected beam from the liquid surface and focuses that portion thereof to a centrum. A beam detector is positioned at the centrum and provides an indication of changes in the level of the liquid surface by detecting corresponding changes in the relative position of the centrum. A narrow pass interference filter can be used to intercept the reflected beam before the converging lens to allow only the frequency of the monochromatic illumination source to pass therethrough thus eliminating nearly all of the thermal radiation eminating from the melt in a Czochralski furnace.

BRIEF DESCRIPTION OF THE DRAWINGS

The above mentioned and other features and objects of the invention and the manner of attaining them will become more apparent, and the invention itself will be best understood, by reference to the following description of an embodiment of the invention taken in conjunction with the accompanying drawings, wherein.

DESCRIPTION OF A PREFERRED EMBODIMENT

Figure 1:
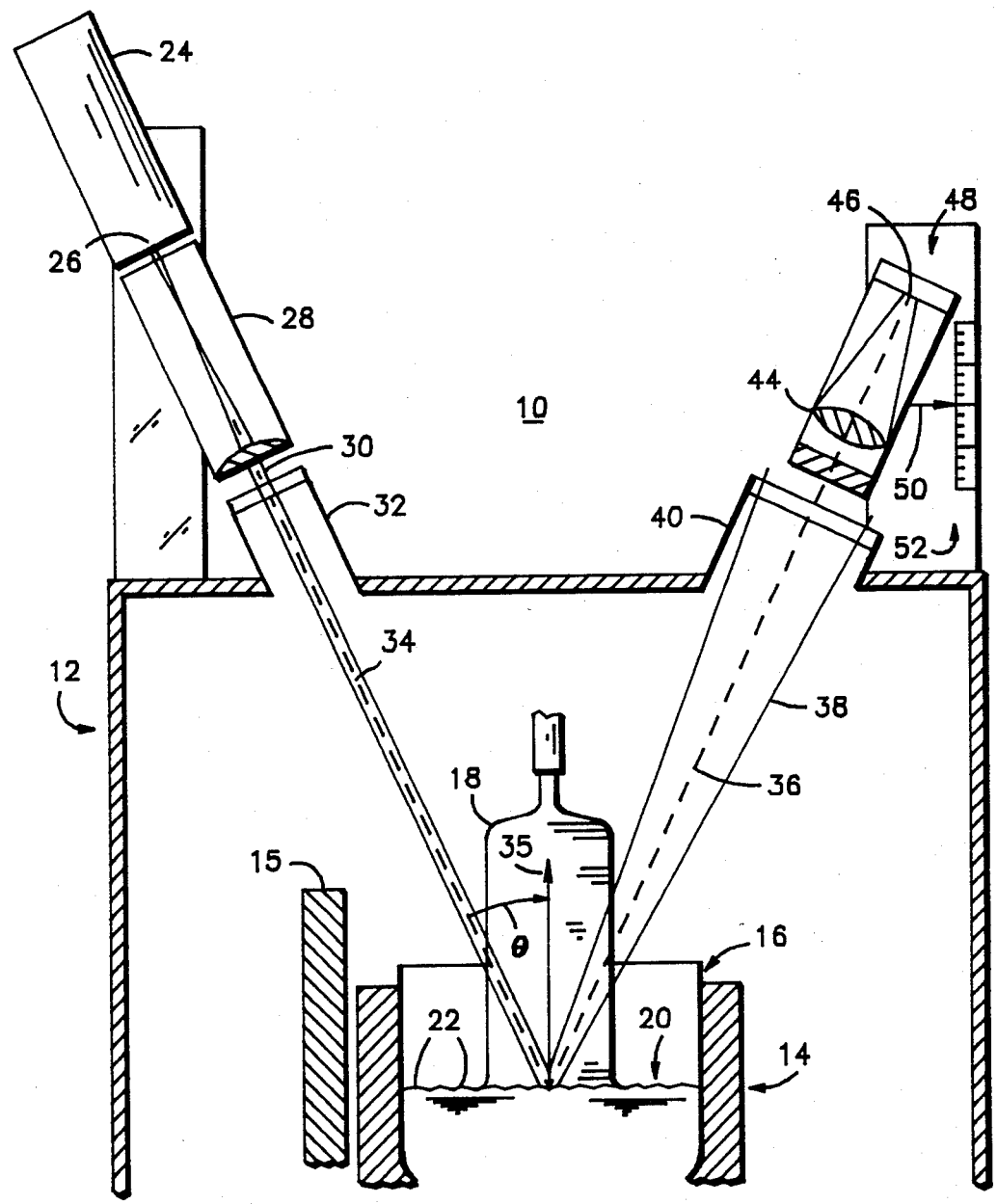
FIG. 1 is a simplified, cross-sectional, plan view of a melt level sensing system according to the present invention for use in a Czochralski crystal growing furnace.

Referring now to FIG. 1, the melt level sensing system 10 of the invention is shown for use in conjunction with a conventional Czochralski furnace 12. In the Czochralski process, a crystal 18 is controllably withdrawn from a melt contained within a quartz crucible 16, supported by a graphite cup 14, and heated by a graphite heater 15. The melt level is maintained by vertical adjustment of the position of graphite cup 14 and quartz crucible 16 with respect to the graphite heater 15.

As illustrated, the melt level surface 20 comprises a multitude of surface disturbances 22 due to thermal convection currents especially violent prior to dip in and shouldering operation, the counter-rotation of crystal 18 and quartz crucible 16, erratic crystal wetting, and other forces. In this manner, surface disturbances 22 cause melt level surface 20 to deviate from an otherwise mirror-like surface.

In the embodiment shown, a laser 24 provides an essentially monochromatic source of illumination for use with the melt level sensing system 10 of the present invention. Laser 24 provides a very intense, monochromatic source of illumination of a very narrow beam width. With the 2.0 mw helium neon (HeNe) laser utilized, a laser beam 26 of approximately 0.5 millimeter beam diameter is provided. Laser beam 26 is then directed through a beam expander 28 which serves to broaden the diameter of laser beam 26 in order to make the beam diameter of incident beam 30 substantially large with respect to the wavelength of the surface disturbances 22 on melt level surface 20. Typically, a 32X beam expander would suffice. When incident beam 30 is directed through view port 32 of Czochralski furnace 12, a reflected beam 38 results from the reflection of incident beam 30 by melt level surface 20. As additionally shown in FIG. 3, the longitudinal axes 34 and 36 of incident and reflected beams 30 and 38 respectively, form an angle $\theta$ with respect to a hypothetical vertical reference line 35.

Due to the surface disturbances 22 of melt level surface 20, reflected beam 38 comprises a generally conical cross-section of reflected beam energy about longitudinal axis 36. Reflected beam 38 is allowed to pass through view port 40 where it is thereat incident to filter 42. Filter 42 comprises a narrow bandwidth optical filter which allows therethrough only the monochromatic illumination appearing at the output frequency of laser 24. As the wavelength of the HeNe laser herein comprising laser 24 is approximately 638.8 nm, filter 42 could therewith be furnished as a matching 638 nm unit which might typically have a half bandwidth of 11 nm.

That portion of reflected beam 38 which passes through filter 42 is thereupon incident to lens 44. Lens 44 focuses that portion of reflected beam 38 incident to it to a centrum 46. Centrum 46 is made to fall generally equally upon both halves of split diode detector 48 as determined by the unitary housing for lens 44 and split diode detector 48. Filter 42 may also conveniently be affixed to this housing. The combination of lens 44, filter 42, and split diode detector 48 is slideably secured to the Czochralski furnace 12 at an angle $\theta$ with respect to vertical reference line 35. The combination of lens 44 and split diode detector 48 is then free to move vertically of melt level surface 20 such that an attached indicator 50 can be used to set the melt level on a calibrated scale 52. Additionally, it is apparent that the combination of lens 44 and split diode detector 48 can sense any change from the preset melt level and provide control outputs to adjust the level of quartz crucible 16 or the control of other processing parameters in an automated system.

Figure 2:
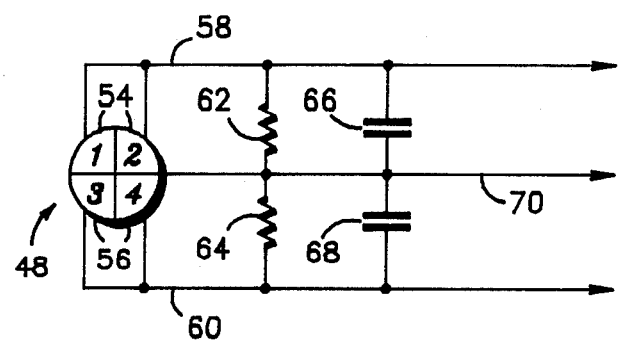
FIG. 2 is a schematic illustration of the split diode detector and its associated circuitry for use with the embodiment of the invention illustrated in FIG. 1.

Referring additionally to FIG. 2, the split diode detector 48 of the invention is shown. In the embodiment illustrated, split diode detector 48 comprises a four-segment photodiode having photodiodes 54 and 56 connected such that centrum 46 is sensed only along the axis bisecting photodiodes 54 and 56. Split diode detector 48 may be conveniently furnished using a United Detector Technology PIN Spot/8 D detector. A long time constant RC network comprising resistor 62 and capacitor 66 parallels photodiodes 54 between output line 58 and common line 70. In like manner, the matching RC network comprising resistor 64 and capacitor 68 parallels photodiodes 56 across output line 60 and common line 70.

The split diode detector 48 can also be used to sense and correct system alignment in the lateral direction due to changes in melt shape due to a possible change in quartz crucible 16 rotation. Increasing or decreasing quartz crucible 16 rotation changes the parabolic shape of melt level surface 20 and shifts reflected beam 38 laterally. This may be a deliberate process variable in which case it might prove necessary or desirable to be able to track reflected beam 38 laterally.

SYSTEM OPERATION AND THEORY

Figure 3:
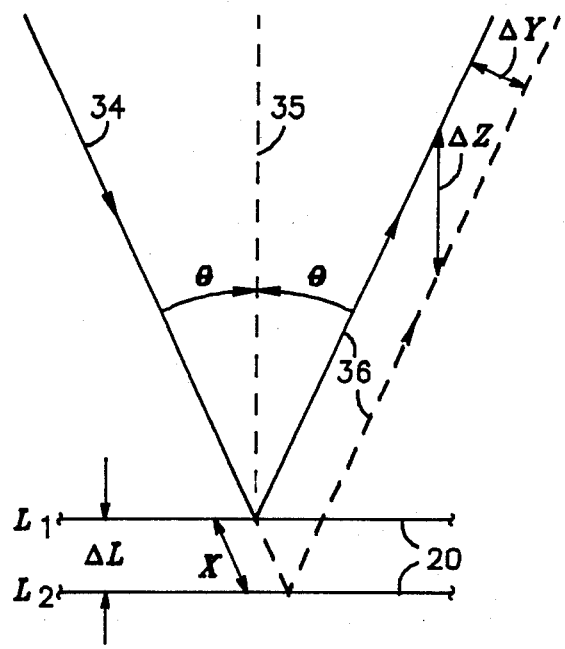
FIG. 3 is a geometrical representation of the longitudinal axes of the incident and reflected beams in the present invention showing the relationship between a change in melt level ($\Delta L$) and the centrum of the reflected beam as determined by the split diode detector of FIGS. 1 and 2.

Referring now to FIG. 3, the longitudinal axis 34 of incident beam 30 is illustrated with respect to the longitudinal axis 36 of reflected beam 38 for a melt level surface 20 at positions $L_1$ and $L_2$. Longitudinal axes 34 and 36 form an angle $\theta$ with respect to vertical reference line 35. The component of longitudinal axis 34 due to the decrease ($\Delta L$) in melt level surface 20 from position $L_1$ to $L_2$ is designated "X". The distance between longitudinal axes 36 due to this $\Delta L$ is designated $\Delta Y$. Correspondingly, the distance $\Delta Z$ through which split diode detector 48 must be moved in order to place centrum 46 midway between photodiodes 54 and 56 is shown. These various parameters are related as follows:

The cosine of angle $\theta$ is given as:

$$\cos \theta = \Delta L/X$$

Solving for X:

$$X = \Delta L/\cos \theta$$

Additionally:

$$\sin 2\theta = \Delta Y/X$$

Solving for $\Delta Y$:

$$\Delta Y = X \sin 2\theta$$
$$= \frac{\Delta L \sin 2\theta}{\cos \theta}$$
$$= \Delta L (2 \sin \theta)$$

Thus, for example, if $\theta = 22.5°$ $$\Delta Y = 0.76 \Delta L$$

As shown:

$$\Delta Z = 2\Delta L$$

Thus, in the embodiment shown, laser 24 will provide a 0.5 millimeter beam diameter as the output of the 2.0 milliwatt HeNe device. Utilizing a 32X beam expander 28, incident beam 30 will then have a beam diameter of about 16 millimeters. This beam diameter serves to illuminate an area on melt level surface 20 which is large compared to the wavelength of surface disturbances 22. This gives a reflected beam 38 which, in effect, averages the reflection over a large area.

The centroid of the reflected beam 38 falling along longitudinal axis 36 at centrum 46 is located by means of split diode detector 48. The position of centrum 46 will, in fact, move in response to the position of lens 44 within longitudinal axis 36 although lens 44 intercepts generally parallel light rays due to the optical abberation called "COMA" inherent in all such lens. Lens 44 then focuses the emergent cone of reflected beam 38 on the closely spaced photodiodes 54 and 56 of split diode detector 58 such that the fluctuating energy distribution on the photodiodes 54 and 56 are averaged separately by long time constant RC networks. The difference signal output is used as a null detector to tell when the split diode detector 48 is on the centroid of reflected beam 38. It should also be noticed, that the sum output of the split diode detector 48 should be used to render the system insensitive to large changes in light level caused by calming of the melt at roll over. This is done by sensing both the sum and the difference of the diode outputs and using the ratio of the difference to the sum as the corrected output of the system. By using the split diode detector 48 in the null mode, the problem of changing signal strengths due to light source variations or the condensation of oxides and dopants on the view ports further minimized.

What has been provided therefore is an improved melt level sensing system and method which will accurately determine the initial melt level in a Czochralski crystal growing process as well as a measurement of the melt level throughout the growth process. Moreover, the present invention provides a system and method having a good signal to noise ratio despite the presence of the intense thermal radiations encountered in such a process. Further, the system and method of the present invention will accurately determine melt level in the presence of surface waves and ripples due to turbulent convention, and mechanical vibrations due to cup rotation or other causes. Finally, the present invention provides a system and method for the accurate sensing of melt level despite the partial obscuration of the furnace view ports due to the condensation of oxides and dopants or light source variances.

It should be understood that melt level sensing system 10 may be used to fix and maintain a constant melt level by closing the control loop on the graphie cup 14 lift drive or it can be used to program a changing melt level by operating off of null or by motorizing the split diode detector 48 mount to drive split diode detector 48 to a new location.

While there have been described above the principles of this invention in conjunction with specific apparatus, it is to be clearly understood that this description is made only by way of example and not as a limitation to the scope of the invention.

I claim:

1. A sensing system for detecting changes in the level of a liquid surface comprising:
    a source of essentially monochromatic illumination of narrow beam width for directing an incident beam toward said liquid surface at an oblique angle thereto, and providing a reflected beam therefrom;
    a beam expander interposed between said illumination source and said liquid surface for increasing said narrow beam width of said incident beam to a beam width substantially greater than the wavelength of most disturbances in said liquid surface;
    a converging lens transverse to and intercepting a portion of said reflected beam from said liquid surface for focusing said portion of said reflected beam to a centrum; and a beam detector positioned adjacent to said centrum for providing an indication of changes in said level of said liquid surface by detecting corresponding changes in a relative position of said centrum.

2. The system of claim 1 further comprising:
a filter interposed between said converging lens and said liquid surface for intercepting said portion of said reflected beam and transmitting therethrough an optical signal of substantially said monochromatic illumination frequency to said converging lens.

3. The sensing system of claim 1 wherein said illumination source comprises a laser.

4. The sensing system of claim 3 wherein said said laser comprises a HeNe laser.

5. The sensing system of claim 1 wherein said incident beam beam width is increased by said beam expander to substantially 16 millimeters.

6. The sensing system of claim 1 wherein said beam detector comprises a pair of photodiodes providing a null output when said centrum falls directly between them.

7. A Czochralski furnace including a melt crucible containing a liquid surface of variable level comprising:
a source of essentially monochromatic illumination of narrow beam width for directing an incident beam toward said liquid surface at an oblique angle thereto, and providing a reflected beam therefrom;
a beam expander interposed between said illumination source and said liquid surface for increasing said narrow beam width of said incident beam to a beam width substantially greater than the wavelength of most disturbances in said liquid surface;
a filter intercepting a portion of said reflected beam and transmitting therethrough an optical signal of substantially said monochromatic illumination frequency;
a converging lens transverse to and intercepting said optical signal from said filter for focusing said optical signal to a centrum; and
a beam detector positioned adjacent to said centrum for providing an indication of changes in said level of said liquid surface by detecting corresponding changes in a relative position of said centrum.

8. The Czochralski furnace of claim 7 wherein said illumination source comprises a laser.

9. The Czochralski furnace of claim 8 wherein said laser is a HeNe laser.

10. The Czochralski furnace of claim 7 wherein said incident beam beam width is increased by said beam expander to substantially 16 millimeters.

11. The Czochralski furnace of claim 7 wherein said beam detector comprises a pair of photodiodes producing a null indication when said centrum falls between them.

12. A method for sensing the level of a liquid surface comprising the steps of:
furnishing a source of essentially monochromatic illumination of narrow beam width for directing an incident beam toward said liquid surface at an oblique angle thereto and providing a reflected beam therefrom;
expanding said narrow beam width of said incident beam to a bandwidth substantially greater than the wave length of any disturbances in said liquid surface;
intercepting a portion of said reflected beam from said liquid surface and focusing said portion of said reflected beam to a centrum; and
detecting the position of said centrum and producing an indication of changes in said level of said liquid surface by corresponding changes in a relative position of said centrum.

13. The method of claim 12 wherein said step of furnishing is carried out by means of a laser.

14. The method of claim 12 wherein said step of expanding is carried out by means of a beam expander.

15. The method of claim 12 wherein said steps of intercepting and focusing are carried out by means of a converging lens.

16. The method of claim 12 wherein said steps of detecting and producing are carried out by means of a beam detector.

17. The method of claim 12 further comprising the step of filtering said portion of said reflected beam prior to said steps of intercepting and focusing and transmitting therethrough said portion of said reflected beam at substantially a frequency of said monochromatic illumination.

* * * * *